United States Patent [19]

Symes et al.

[11] Patent Number: 4,571,422
[45] Date of Patent: Feb. 18, 1986

[54] POLYMER SUSPENSIONS

[75] Inventors: Ken C. Symes, Keighley; John Langley, Shipley; Peter Flesher, Bingley, all of United Kingdom

[73] Assignee: Allied Colloids Limited', England

[21] Appl. No.: 609,681

[22] Filed: May 14, 1984

Related U.S. Application Data

[63] Continuation-in-part of Ser. No. 552,591, Nov. 16, 1983, abandoned.

[30] Foreign Application Priority Data

May 17, 1983 [GB] United Kingdom ............... 8313521
Sep. 23, 1983 [GB] United Kingdom ............... 8325503
Dec. 23, 1983 [GB] United Kingdom ............... 8334313

[51] Int. Cl.$^4$ .............................................. C08B 37/00
[52] U.S. Cl. ..................................... 536/114; 106/208; 252/8.5 C; 252/8.55 R; 252/8.55 D; 252/363.5
[58] Field of Search ............... 252/8.55 D, 8.55 R, 252/8.5 C, 363.5; 166/293; 106/191, 170, 208; 536/87, 114

[56] References Cited

U.S. PATENT DOCUMENTS

| | | | |
|---|---|---|---|
| 3,979,349 | 9/1976 | Fink et al. | 524/300 X |
| 4,029,622 | 6/1977 | Keller et al. | 524/375 X |
| 4,249,608 | 2/1981 | Carter | 252/8.55 X |
| 4,312,675 | 1/1982 | Pickens et al. | 106/191 X |
| 4,325,861 | 4/1982 | Braun et al. | 524/41 X |
| 4,374,216 | 2/1983 | Dammann | 524/35 |
| 4,454,260 | 6/1984 | Dawans et al. | 166/275 X |

FOREIGN PATENT DOCUMENTS 1482515 8/1977 United Kingdom .

*Primary Examiner*—Herbert B. Guynn
*Attorney, Agent, or Firm*—Lawrence Rosen

[57] ABSTRACT

Polysaccharide is provided as a fluid composition that is a dispersion of the polysaccharide in oil and that contains a dispersion promoter selected from surfactants and stabilizers. The dispersion is generally a stable flocculated dispersion. It is generally made by dispersing an aqueous polysaccharide solution having a consistency index of about 20,000 cps in oil in the presence of dispersion promoter and then drying the dispersion. The oil generally comprises volatile and non-volatile components such that the drying can be by azeotroping. The dispersion promoters are generally selected from amphiphatic copolymers and surfactants having HLB at 20° C. above 6.5 but which serve as water in oil dispersing agents during the formation of the dispersion. Aqueous solutions of the polysaccharide can be made by dispersing the fluid composition in water. These aqueous solutions are of particular value in methods of enhanced oil recovery.

22 Claims, No Drawings

POLYMER SUSPENSIONS

This application is a continuation in part of our Application Ser. No. 552591 filed Nov. 16, 1983, now abandoned.

Xanthan and other microbial polysaccharides are made initially as very dilute aqueous solutions. Even at very low concentrations these solutions are very viscous. Typically the consistency index of the solutions is above 25,000 cP. Very concentrated solutions therefore cannot easily be handled and when it is necessary to increase the solids content it is conventional to provide the polysaccharide in solid form by precipitation from its solution and then drying the precipitate.

It is essential that the solid polysaccharide should dissolve easily and quickly and rapidly provide its maximum viscosifying power. This is of particular value for downhole use, for instance as a drilling mud and for enhanced oil recovery.

With Xanthan gum in particular many methods have been reported, or are used in practice, to improve solution rate. Of these, surface and/or chemical treatments (with glyoxal, borate, and encapsulation with fat plus surfactant) predominate but several other approaches have also been suggested. Thus it is known that precipitation of the gum from Xanthomonas fermentation broth at low temperature gives a product with improved dispersibility in brine. Alternatively, the gum can be dissolved in fresh water and diluted with brine (U.S. Pat. No. 4104193). Xanthan gum suspensions in non-solvents containing suspending agents, e.g. in water/alcohol mixtures containing hydroxypropyl cellulose (U.S. Pat. No. 3894879) and in hydrophobic liquids containing poly(12-hydroxystearic acid) (British Patent Application No. 2018300A) have been described.

Even though these modifications can improve solution rate and properties, the use of solid grade products incurs other problems. For instance storage, handling and measuring powder can be difficult and it is difficult to obtain concentrated solutions by mixing powder with water. Also the preliminary step of converting the aqueous solution to a solid is a complicated process in practice and tends to damage the product. In a typical commercial drying process, Xanthomonas-fermentation broth is mixed with an equivalent volume, or more, of a water-miscible organic solvent, usually propan-2-ol and the wet precipitate thus obtained is subjected to a series of operations (pressing, pelletizing, drying and milling) to afford the powdered product. Careful control of each stage of this post-fermentation process is necessary to ensure a high quality product. Even so, some deterioration in product quality is almost inevitable, probably due to hornification or partial insolubilisation during drying. This is a particular disadvantage when quick and total dissolution is required.

For instance the product has only limited use as a suitable product for enhanced oil recovery (E.O.R.) processes, since it has poor rate of dissolution, and has poor injectivity into tight formations which thus drastically restricts its use. The technical requirements for a product suitable for EOR even in the most difficult environment are that the product should dissolve in the injection water rapidly and completely, irrespective of the salinity and multivalent metal ions present, to form a viscous aqueous solution at low concentration (100 ppm–3000 ppm). The polymer solution must be of satisfactory quality to ensure that the viscous solution can be injected, even into the tightest formations (<10 millidarcies) without a progressive increase in pumping pressure, commensurate with formation plugging. Formation plugging and rapid increase in pumping pressure can lead to fracturing and permanent formation damage.

In order to preserve the inherent good injectivity and rate of dissolution of the Xanthomonas-fermentation broth suitable for all E.O.R. processes, the commercial trend is to supply undried fermentation broths, as prepared, as aqueous solutions with concentrations of 2-4% or further concentrated up to 10% or even 15% w/w. The final aqueous polymer solutions exhibit good rates of dilution in injection brines and excellent injectivity even into the tightest formations.

These products therefore exhibit the ideal technical requirements for E.O.R. processes, but their low concentration causes high transportation and storage costs, and presents major logistics problems particularly for off-shore operations. Also handling and mixing procedures for the more concentrated solutions become increasingly difficult with increasing concentration. Despite these problems the other properties of Xanthan solutions for enhanced oil recovery are so good that the industry tends to tolerate the storage and logistics problems and to prefer the solutions.

Somewhat similar problems occur with other uses of Xanthans and with other polysaccharides for these or other uses. Generally a choice has to be made between a viscous dilute aqueous solution or a solid that gives inferior performance.

It has been our object to provide a liquid composition of polysaccharide that can be much more concentrated than the most concentrated aqueous solutions that can be handled, that can be handled more easily than them and that can have performance qualities often better than those of the corresponding solid grade product, preferably approaching or as good as the performance qualities of the solution grade product. This objective has not previously been possible or proposed in the polysaccharide industry. A further object has been that the liquid composition should preferably have good storage stability.

It is known in the synthetic polymer industry to obtain a water-in-oil fluid dispersion of aqueous particles of water soluble polymer dispersed in oil by dispersing an aqueous solution of monomer in oil and then polymerising the monomer. It is also known to dry the resultant dispersion by azeotroping it so as to form a fluid dispersion of substantially dry particles dispersed in oil. It is well accepted that this azeotroping step has a tendency to reduce the activity of the polymer, e.g. as a flocculant, compared to its activity while still in the form of an aqueous solution.

The possibility of granulating an aqueous gel of a polymer in oil has been recognised (for instance in British Patent Specification No. 1277577) but, as is admitted in that specification, this involves the handling of thick gels and the use of shearing machinery which increases the cost of manufacturing considerably. Also the application of shear to an aqueous gel is liable to damage the polymeric structure, with the result that there is a risk that the performance qualities will again be decreased. This is a particular problem if a fine dispersion, as opposed to a coarse granular product is desired. Accordingly it is recognised that it is not satisfactorily possible to form the water-in-oil polymer dispersion starting from a solution of the polymer and in practice the water in oil polymer dispersion is always made by insitu polymerisation.

It is known from examples 13 and 14 of U.S. Pat. No. 3,979,349 to disperse, respectively, 20% aqueous gelatin and 10% aqueous polyvinyl alcohol in oil but these solutions are unusual polymeric solutions in that they have much lower viscosity than most water soluble polymers and so dispersion can be achieved by such low shear, for instance simple stirring, that there is no danger of damaging the polymer. For instance a typical 10% aqueous polyvinyl alcohol solution may have a consistency index below 3,000 cP. These solutions therefore are entirely different from the aqueous polymers that the industry has accepted can not conveniently be dispersed into oil and are entirely different from the very viscous polysaccharide solutions that at present are used for, for instance, enhanced oil recovery.

We have now found it is possible to form fluid dispersions that have a high solids and low water contents and that such dispersions can be stable. We have also found that an aqueous polysaccharide solution having a consistency index that is so high that one would not expect to be able conveniently and satisfactorily to emulsify it into water, for instance above 20,000 cP, and often above 50,000 cP, can be dispersed satisfactorily into oil using conventional and economically acceptable dispersing apparatus and that this can be done without causing significant damage to the final properties of the polysaccharide. We also surprisingly find that it is possible to dry the dispersed polysaccharide to low water contents without the substantial loss of activity conventionally associated with drying polysaccharide.

According to one aspect of the invention a fluid composition of polysaccharide in oil is obtained by dispersing an aqueous polysaccharide solution in oil, in the presence of a dispersion promotor selected from surfactants and stabilisers, and drying the resultant water-in-oil emulsion.

The initial polysaccharide solution normally contains at least 80% water and the resultant water-in-oil product can be regarded as an emulsion. When the emulsion is dried the amount of water in the dispersed phase, is normally below 50% and the dried product can be regarded as a dispersion (solid in liquid) rather than an emulsion (liquid in liquid). Often the water content of the dispersion is much less than 50%, for instance 10% or even less than 1%.

By the invention it is therefore possible to achieve, for the first time, a fluid composition having an acceptable viscosity, having a much higher polysaccharide concentration than has previously been available in fluid compositions and having very satisfactory dissolution and other properties. For instance when the polysaccharide is xanthan the dissolution and other properties are much better than the properties of solid grade products, and approach or are as good as the properties of the normal dilute solutions. In particular it is, for the first time, possible to provide concentrated liquid compositions of Xanthan and other microbial polysaccharides that are suitable for enhanced oil recovery (and other oil industry and other uses) and that avoid or greatly minimise the logistical and other problems associated with the use of conventional aqueous solutions, especially on off-shore rigs, while providing properties as good as or almost as good as the properties of these solutions. Also, by the invention many of the difficulties when using powdered products are completely avoided.

The composition obtained in the invention is preferably a stable dispersion, that is to say on storage for, say, 1 month or more and preferably for 2 months or more there is either no separation of the particles from the dispersion or, if there is any separation, they can be resuspended by shaking or mild agitation. However for some purposes it is satisfactory for the composition to be in the form of an unstable dispersion. This may be agitated occasionally during storage to prevent serious separation occurring or may be used without being stored for sufficient time to permit separation. For instance a composition may not separate significantly if stored for say only 2 weeks but may separate if stored under static conditions for 2 months.

Accordingly to a second aspect of the invention a novel stable polysaccharide composition is a flocculated dispersion in oil of polysaccharide particles in oil, containing surfactant and/or stabiliser. The particles may be anhydrous or may contain some water, e.g. up to 70% by weight based on the weight of polysaccharide plus water. The composition is a fluid.

This flocculated dispersion is a stable dispersion and is preferably made by dispersing into oil an aqueous polysaccharide solution, for instance having a consistency index as described above, and drying the resultant water in oil emulsion. Since this is the preferred method of making the dispersion, and is the method according to the first aspect of the invention, all further description of both aspects of the invention is written in terms of the use of this process. However it must be understood that other ways of making this flocculated dispersion can be used and are included within the scope of the invention.

The stability towards settlement of particles dispersed in liquids is a function of the average particle size distribution. For isolated particles the sedimentation rate is proportional to the second power of the diameter and to the density difference between the particle and the surrounding medium. With synthetic polymer particles an average diameter of 0.1–1 $\mu$m is normally required for the dispersion to remain stable for long periods, e.g. several weeks before a sediment is formed. It is known that finely divided powders dispersed in liquid media may interact with each other to form aggregates, agglomerates or flocculates (see S. H. Bell and V. T. Crowl, Chapter 5 in "Dispersion of Powders in Liquids", Ed. G. D. Parfitt Elsevier, London 1969). Usually these interactions lead to the formation of flocs and a lessening of stability. If the dispersion is unstable, the particles (or flocs of particles) sediment in it. The density of the sedimented layer increases downwardly and, at least during sedimentation, there may be no clear demarkation between the sediment and the supernatant.

Instead of the particle-particle interactions causing the formation of flocs that sediment it is possible for particle-particle interactions to spread throughout the body of the composition leading to the formation of a particulate structure that can be considered to be a single large floc. The resultant product is termed a flocculated dispersion. Subsidence of the solids to leave a clear supernatant may occur but the subsided network has substantially uniform density throughout its depth and during subsidence and storage there will be a clear transition between the solids and any supernatant, which will be clear. The subsided solids can very easily be converted back to a uniform fluid dispersion by gentle agitation. The differences between flocculated dispersions and other dispersions are discussed in Ind. Eng. Chem. Process Des. Dev, 1981, 20 pages 289–294 in the context of carbon dispersions. Flocculated dispersions are also described by Smellie et al in J. Colloid Sci., 1956, 11, p720.

The emulsions of aqueous polysaccharide particles in oil can be formed using conventional emulsifying apparatus. Usually the solution is added gradually to the oil. The degree of shear and emulsification will be chosen having regard to the final particle size that is desired. The solution may include alkali, generally ammonia, to raise the pH, e.g. up to 9 or 10, to inhibit the risk of cross-linking. The solution is preferably free of formaldehyde.

Stable dispersions of polymer in oil, even containing surfactant and/or dispersing agent, would be expected to require that most of the polymer particles should be below 1 or at the most 2 microns in size, but in the invention we surprisingly find that satisfactory results can be achieved despite most of the particles in the final dispersion having a size above 1 or 2 microns the majority preferably being 2–10 microns. These particle sizes are of the particles obtained after substantial drying of the dispersion (generally to below 20% water) and so the size of the aqueous particles in the emulsion, before drying, will be larger by a factor generally of 1.5 to 2.5, often about 2.2. Thus the majority will be in range 4 to 25 microns. Typically at least 50% by weight of the dry particles are below 10 microns whilst not more than 50% are below 2 microns. In particular preferably 3 to 20%, most preferably 7 to 13% by weight of the particles are above 10 microns in size and 3 to 20%, most preferably 7 to 13% of the particles are below 1 micron in size.

The emulsion is formed in the presence of surfactant and/or stabiliser. Surfactant and/or stabiliser may be added after formation of the emulsion, for instance the emulsion may be formed in the presence of surfactant and stabiliser may be added before drying. The surfactant reduces interfacial tension, so as to promote the formation of the emulsion, and the stabiliser tends to form interfacial films and to stabilise the dispersion once formed, especially during drying.

Surfactants that will serve as water in oil emulsifiers generally have a low HLB value at 20° C. while surfactants that have high HLB values normally lead to the formation of an oil in water emulsion or to the formation of a very unstable emulsion. Although surfactants having, e.g. HLB of 3 to 6 can be used for formation of the emulsion of aqueous polysaccharide in oil, this emulsion is preferably formed using a surfactant which serves as a water in oil dispersing agent but which at 20° C. has an HLB value of at least 6.5, generally at least 7 and typically 8 to 11, preferably 9.5 to 10.5 and which serves as water in oil dispersing agent during the formation of the emulsion. Some of these high HLB surfactants are water in oil emulsifiers at 20° C. and so can be used at ambient temperatures. Other high HLB surfactants are oil in water emulsifiers at ambient temperatures but become water in oil emulsifiers when heated to above their phase inversion temperature. With such emulsifiers it is then desirable to form the emulsion above the phase inversion temperature of the surfactant.

The surfactants are generally nonionic. Preferably they are ethyleneoxide condensates of sorbitan esters or of sorbitol esters but other suitable surfactants are glycol esters and ethyleneoxide condensates of nonyl or other alkyl phenols, ethylene oxide condensates of fatty alcohols or acids and ethyleneoxide propyleneoxide copolymers. Mixtures may be used.

The preferred materials are ethoxylated sorbitan monooleate (e.g. Tween 81, containing 5 ethoxy groups and HLB about 10), ethoxylated sorbitol septaoleate (e.g. Arlatone T, containing about 40 ethoxy groups and HLB about 9.5) and polyethylene glycol oleates. Suitable low HLB surfactants include sorbitan esters such as Span 80 (sorbitan monooleate, HLB about 4.3). Span, Tween and Arlatone are trade marks.

The amount of surfactant is normally in the range 0.1 or 0.5 to 15% by weight of the oil phase present during emulsification. It is usually necessary that the amount of surfactant is at least 0.5% and amounts of 1.0 to 5% are preferred. The amount in the final dispersion is generally from 2 to 20%, often 5 to 15%, by weight of the dispersion.

It is generally preferred to include also a stabiliser, this generally being incorporated during the emulsification stage. The amount of stabiliser is generally from 0.1 or 0.5 to 10% and is preferably above 0.5%, typically 1.0 to 5% and most preferably 1.5 to 3% by weight of the oil phase during emulsification. The amount in the final dispersion is generally 2 to 25%, often 5 to 15%, by weight of the dispersion.

The weight ratio of surfactant to stabiliser is generally from 10:1 to 1:4, preferably 2:1 to 1:2 and most preferably 1.5:1 to 1:1.2. Mixtures of stabilisers may be used. The total amount of surfactant and stabiliser (if present) is generally from 10 to 50%, preferably 15 to 40%, by weight of the polysaccharide.

The stabiliser minimises the risk of coagulation or undue thickening of the emulsion during azeotropic distillation. The stabiliser should be an oil soluble polymeric stabiliser and preferably is an amphipathic copolymers of one or more hydrophobic monomers with one or more hydrophilic monomers. The hydrophobic monomers may be acrylates such as $C_8$ to $C_{24}$, optionally together with $C_1$ and $C_4$, alkyl esters of acrylic or methacrylic acid, for instance ceto-stearyl or stearyl methacrylate, optionally copolymerised with methyl methacrylate. The hydrophilic monomers, may be anionic, cationic or non-ionic, preferably being methacrylic acid or other acrylic monomer. Examples of preferred stabilisers are described in British Patent Specification No. 1482515 to which reference should therefore be made. The preferred stabilisers are copolymers of ceto stearyl methacrylate and methacrylic acid containing 60–70% molar of the methacrylate ester. Other polymeric stabilisers include polyhydroxy stearic acid-polyethylene glycol condensates, for instance with oleic acid, and maleic polymers such as those described in U.S. Pat. No. 4339371.

Since the drying of the emulsion is normally effected by azeotroping it is normally necessary that the oil for the external phase of the emulsion, or at least one component of the oil, forms an azeotrope with water. The oil may be, for example, a mineral oil, diesel oil, vegetable oil, or a halogenated hydrocarbon. Examples of suitable oils are commercially available hydrocarbons, preferably with boiling ranges in the region of 150° C.–250° C. The oil phase can be any liquid which is immiscible with the aqueous phase. Preferably it is a blend of non-volatile oil with a volatile component which forms an azeotrope with water. Volatile or non-volatile oil can be added after the formation of the emulsion. The non-volatile component of the phase should have a boiling range substantially higher than that of the volatile component, typically 300° C.

Polar liquids may be included in the emulsion (generally by admixture with the oil) or the dispersion to facilitate emulsification and/or to improve stability of the composition and/or to act as a humectant for the polysaccharide. Glycols, for instance ethylene glycol, and glycol ethers are suitable.

We have surprisingly found that, especially when the polysaccharide is Xanthan, there is a marked increase in stability against settlement if at some stage of the emulsification process of the aqueous solution with oil the temperature is at least 50° C. e.g. 50°–120° C. and preferably 75°–95° C. The emulsification is preferably effected in the presence of a suitable surfactant and a stabiliser. The initial temperature is not important and what matters is that at some stage in the emulsification the temperature is at least 50° C. and is kept there for sufficient time to produce emulsification. It is possible to add hot oil to cold solution or hot solution to cold oil. The dispersion could be formed at a temperature lower than 50° C. and then the process of emulsification continued at a temperature higher than 50° C.

The invention is of particular value when the polysaccharide solution used for forming the water in oil dispersion has a consistency index above 20,000 cP but solutions of lower viscosity can be used. The consistency index may be above 50,000 and is often 100,000 or more, for instance up to half a million, cP. For instance a typical 7% Xanthan solution may have a consistency index of about 66,000 cP. The solution will generally be as concentrated as it can be consistent with ability to handle it and to disperse it into oil, so as to maximise the polysaccharide solids put into the dispersion. Generally the concentration microbial or other polysaccharide in the solution is from 5 to 20% with best results generally being achieved at concentrations of 6–10% or sometimes up to 15% by weight saccharide in the aqueous solution.

The solution may be obtained in any convenient manner. Preferably it is a solution in which the polysaccharide is initially prepared for instance it may be a broth, or a concentrated solution obtained from a broth, in which a xanthan or other microbial polysaccharide is formed by fermentation. However in some instances it is useful to form the dilute solution for emulsification into oil by dissolving powder in water e.g. when it is desired to facilitate the production, by a user, of an aqueous solution that is more concentrated than can conveniently be made from powder.

The water in oil emulsion that is formed generally contains from 25–80%, most preferably 40–70% and generally around 60% by weight aqueous polysaccharide solution, with the remainder of the emulsion being provided by the oil and any surfactant and/or stabiliser.

The water in oil emulsion is dried to remove water, generally by azeotroping. Heating the dispersion for prolonged periods of half an hour or more is undesirable as it can contribute to loss of activity and so the azeotroping is preferably conducted in such a way that the dispersion is heated only for a few minutes or seconds. Generally the azeotroping is conducted in a thin film evaporator or by a flash evaporator. In order to permit azeotroping to be completed at low temperatures it is preferably conducted under reduced pressure, generally below 100 mm and typically 10–30 mm mercury. The duration of azeotroping is normally such as to reduce the water content, based on the weight of water plus polysaccharide, to 70% and generally to below 50%. Normally the dispersions are dried to a water content (based on water plus polysaccharide) of below 30%, generally below 20%, and in the driest dispersions, below 15 and preferably below 10%, typically 2–8% water. Drying the polysaccharide below its ambient moisture content, when exposed to the normal atmosphere, may be undesirable.

The azeotroping generally results in the removal of at least half the oil present in the initial water in oil dispersion and the final composition therefore generally consists substantially only of substantially dry polysaccharide particles, additives such as the surfactant and the stabiliser discussed above, and substantially non-volatile oil. The polysaccharide content of the final dispersion is usually above 25% and below 75% by weight, with amounts of 40 to 70% and generally around 60% by weight being preferred.

The total amount of additives necessary to keep the polysaccharide in stable dispersion, and in particular to provide a flocculated dispersion increases as the amount of polysaccharide in the dispersion decreases, the least amount of additives being needed for dispersions having the greatest concentration of polysaccharide. A convenient relationship with many preferred surfactant/stabiliser combinations is that the dispersion contains, per part by weight polysaccharides, at least $10/x$, and preferably at least $12/x$, but generally not more than $20/x$ or at most $25/x$, parts by weight additives where $x$ is the percentage of polysaccharide in the dried dispersion, the remainder of the dispersion being provided by the oil. For instance, when the dispersion contains 60% polysaccharide the ratio polysaccharide to additives is preferably about 1:¼, the dried dispersion thus containing 60 parts polysaccharide, 15 parts additives and 25 parts oil. Generally when the dispersion contains from 25 to 35% polysaccharide the amount of additives is 15 to 25%, generally around 20%, and the ratio polysaccharide to additives is about 3:2. When the dispersion contains 35 to 50% polysaccharide the amount of additives is generally from 10 to 20%, preferably around 15%, and the ratio polysaccharide:additives is generally about 3:1. When the dispersion contains 50 to 70% polysaccharide the amount of additives is again around 10 to 20%, preferably around 15%, but the ratio polysaccharide:additives is preferably about 4:1.

The materials and their amounts and the process conditions of forming the dispersion are preferably all chosen so that the resultant composition is a flocculated dispersion, as discussed above. We find that for any particular combination of additives and polysaccharide a minor variation in the ratio of total additives:polysaccharide can determine whether at any particular polysaccharide content, the dispersion is a flocculated dispersion or is some other type of dispersion. If the stability of the dispersion is recorded on a graph in which the vertical axis is the said ratio (generally between 0.1 and 0.5) and the horizontal axis the polysaccharide content (generally between 40 and 70%) it will generally be found that a substantially straight, downwardly sloping, line can be drawn on the graph separating the flocculated dispersions (above the line) from other dispersions (below the line). The position and slope of this line depends on the nature and proportions of the surfactant and stabiliser and routine experimentation will show the proportions of stabiliser and surfactant required in any particular dispersion to make it a flocculated dispersion. When the surfactant is Tween 81 and the stabiliser is a ceto-stearyl methacrylate-methacrylic acid copolymer and the polysaccharide is a xanthan the border line may pass through the points ratio=0.3, polysaccharide=40% and ratio=0.2, polysaccharide=70%. For instance at 40% polysaccharide a dispersion in which the ratio is 0.28 may be unstable but a dispersion in which the ratio is 0.32 may be a stable flocculated dispersion. The same or similar figures apply with other surfactant/stabiliser combinations.

It seems that a surfactant is generally required to permit the formation of a dispersion but that, at high polysaccharide contents, the dispersion may be very viscous unless polymeric stabiliser is included. If the stabiliser is present in large amounts, and especially if the stabiliser has high molecular weight, it may tend to promote conventional floc formation (with consequent destabilisation of the dispersion) rather than promote the formation of a flocculated dispersion. Accordingly if it proves impossible, with one particular blend of additives, to select a total amount of the additives that provides a flocculated dispersion it may be desirable to use a lower amount of the stabiliser (or to omit it altogether) or to use a lower molecular weight stabiliser.

Although the invention is of particular value with Xanthan as the polysaccharide it is also important for other microbial polysaccharides, starch and derivatives thereof, water soluble cellulose derivatives, galactomannon gums, plant exudates and algal gums such as alginate and carrageenan. Commercially the preferred polysaccharides are often referred to as bio-polymers.

The fluid composition of the invention is of particular value when the polysaccharide that gives a solution having a high consistency index. The resultant dispersions are of particular value in enhanced oil recovery.

The invention is also of value wherever these or other polysaccharides have to be provided in fluid concentrated form with maximum retention of activities. Suitable downhole uses for Xanthans and other polysaccharides include drilling muds, workover fluids and other well stimulation fluids, completion fluids, and for providing water retention in cement, especially when the polysaccharide is a cellulose ether such as carboxymethyl hydroxyethyl cellulose. The compositions can also be used in any other situation where it is necessary to present the polysaccharide in high concentration and with high activity, and especially when it is required to provide a composition which will readily dissolve into water to form a viscous solution.

The dispersion is dissolved into water simply by dispersing it into water and exposing the dispersed polysaccharides particles to the bulk water in which it is to be dissolved. The process of dispersion is facilitated by the application of shear or, particularly, by the provision of a surfactant that will act as an oil in water emulsifier. The high HLB surfactants discussed above will generally serve for this purpose during the dissolution stage especially if they required heating during emulsification, and their use is particularly advantageous. However it may be desirable to include a conventional oil-in-water surfactant for promoting the distribution of the dispersion into water and the dissolution of the polysaccharide particles. Suitable amounts are from 1 to 5% by weight of the dispersion. This may be added to the dissolving water, or to the dispersion and may be included during its preparation or immediately prior to use. The surfactant preferably has HLB 7-11 at room temperature.

EXAMPLE 1

Xanthan gum concentrate containing 7 weight percent gum and 0.8% HCHO preservative (86 parts by weight) is adjusted to pH 10 with 30% $NH_3$ (1.6 parts) to avoid cross-linking reactions between the polysaccharide and the HCHO, and added with vigorous stirring to an oil phase held at 85° C. and consisting of

| | |
|---|---|
| 2.1 parts Shell pale oil 60 | (non-volatile oil) |
| 1.2 parts stabiliser | (2:1 molar copolymer of cetostearyl methacrylate and methacrylic acid) |
| 1.0 parts Tween 81 | (surfactant HLB = 10.0) |
| 74.0 parts SBP 11 (Shell) | (volatile oil) |

Mixing is continued at 85° C. for 30 minutes and then the smooth emulsion is cooled to 25° C. and distilled at reduced pressure (14 mm Hg) until no further water hydrocarbon azeotrope can be collected. Volatile oil is next removed by progressively raising the temperature of distillation to 95° C. The remaining non-volatile oil phase contains dried Xanthan gum particles as a mobile flocculated dispersion having a solids content of 56 weight percent.

On storage for 1 month no settlement or oil separation from this mixture is observed. When 1.79 parts of the dispersion is added 98.2 parts of water in the presence of an oil in water emulsifier dispersion occurs promptly with the formation of a viscous 1% Xanthan gum solution. The apparent viscosity shear rate flow curves for this solution in the presence and absence of added sodium chloride (1%) determined using a Haake Rotovisco viscometer shows that no viscosity impairment resulted from the conversion of Xanthan gum to a dried dispersion. 3% of a high HLB phosphate surfactant is included to promote dispersion into water.

EXAMPLES 2 TO 6

Essentially the same procedure is followed for Examples 2 to 6 as described in Example 1 but with variations being made in the type and concentration of surfactant used, the concentration of stabiliser employed and in the temperatures at which emulsification and distillation were performed. The conditions used and the stability to settlement of the resulting dispersions are recorded in the following Table.

TABLE

| Example | HLB | Surfactant % in oil on emulsification | Temperature °C. Emulsion | Temperature °C. Distilation | Stabiliser % in oil on emulsification | Stability |
|---|---|---|---|---|---|---|
| 2 | 9.1 | 3.9 | 45 | 25 | 1.7 | 6 |
| 3 | 10.5 | 5.1 | 60 | 25 | 0 | 7 |
| 4 | 10.1 | 7.8 | 80 | 80 | 2.0 | 10 |
| 5 | 7.1 | 2.2 | 85 | 85 | 1.1 | 9 |
| 6 | 10.0 | 2.3 | 90 | 25 | 1.6 | 10 |

1-5 = noticeable settlement within 24 hours.
6 = instability noted after a few days.
7-9 = stability lasts for weeks.
10 = stable for > 1 month.

Grades 7 to 10 indicate that the product is flocculated.

EXAMPLE 7

The biopolymer concentrate Enorflo S (7.5% solids) supplied by Shell Research Ltd. U.K. (112 parts) is emulsified at 25° C. into an oil phase consisting of:

| | |
|---|---|
| 1.5 parts | stabiliser (as in Example 1) |
| 1 part | Arlatone T (Atlas Chemical Ind. UK) (Surfactant HLB = 9.5) |
| 81 parts | SBP 11 (Shell) (Volatile oil) |

Vigorous agitation is continued for 40 minutes and the smooth white W/O emulsion then distilled at reduced pressure (14 mm Hg) at 25° C. until no further water/hydrogen azeotrope can be collected. Volatile oil is next removed by progressively raising the temperature of distillation to 95° C. The residue (19 parts, 44% solids) is a smooth light brown mobile flocculated dispersion which shows no tendency to settle over a period of several days and which disperses easily and rapidly in water to give a viscous solution.

EXAMPLE 8

A liquid-grade Xanthan product containing 6.4% w/w aqueous polysaccharide (60 parts) is added with vigorous stirring to an oil phase consisting of:

| | |
|---|---|
| 3.6 parts SBP 11 (Shell) | (Volatile oil) |
| 2.64 parts stabiliser | (2.1 molar copolymer of cetostearly methacrylate and methacrylic acid; 30% in SBP 11) |
| 0.53 parts Tween 81 | (surfactant, HLB = 10.0) |
| 0.72 parts Shell pale oil 60 | (non-volatile oil) |

Mixing is continued for 30 minutes and the temperature of the smooth W/O emulsion thus formed is allowed to rise to 70° C. After cooling, the emulsion is next distilled at reduced pressure (14 mm Hg) until no further water/hydrocarbon azeotrope can be collected. Any remaining volatile oil is then removed by continued distillation up to 95° C.

The product is a flocculated mobile dispersion containing 48% by weight dried Xanthan particles, surfactant, stabiliser, non-volatile oil and non-distilling fraction of the volatile oil fraction. After storage for 6 weeks no sediment could be detected in this mixture. When added to water or salt-containing aqueous fluids the dispersion is easily mixed in to allow the Xanthan particles to hydrate and dissolve even under low shear mixing, such as tumbling.

Comparison was made of the ease of hydration of this form of Xanthan gum with (a) the precursor liquid concentrate, (b) and the dried powdered gum (less than 212 μm) recovered from this product by precipitation of the polysaccharide with propan-2-ol (2 volumes) which was then dried in a fan oven at 105° C. for 1.5 hours, and (c) a commercial sample of Xanthan gum powder (sold under the trade name Xanflood).

It was found that the solutions made from the precipitated Xanthan and from Xanflood both blocked the screen through which they were passed but the solutions obtained using the dispersion and using the precursor concentrate had similar viscosity and solution physical properties.

When solutions obtained from the 4 products were subjected to filtration results, to simulate their properties during enhanced oil recovery, again the solutions obtained from the dispersion and the precursor solution were consistently better than the solutions obtained from the two solid products. For instance when the solutions were made in de-ionised water the precursor product and the dispersed product gave a filtration volume of 500 ml in less than 3 minutes while the solutions made from the two solid products gave a volume of less than 200 ml after 30 minutes.

When the solutions were made in synthetic sea water the filtration volume obtained from the solutions made from solid products was 100 ml or less after 30 minutes whilst the filtration volume from the two solutions made using the liquid precursor or dispersion of the invention was between 200 and 300 ml after 30 minutes.

EXAMPLE 9

Xanthan gum concentrate 7% Enorflo X (33 parts by weight) adjusted to pH with 33% $NH_3$ is added to an oil phase at room temperature and consisting of:

| | |
|---|---|
| 2 parts shell pale oil 60 | (non-volatile oil) |
| 1 part stabiliser | as in Example 1 |
| 1 part Span 80 | (surfactant HLB = 4.2) |
| 22 parts SPB 11 | (volatile oil) |

After thorough mixing at 25° C. for 40 minutes the smooth emulsion is distilled at reduced pressure (14 mm Hg) from 25° C. and then progressively to 95° C. to remove first azeotrope and then volatile oil. An oil-soluble surfactant having an HLB value of 12.0 is added to it and the product can easily be dispersed into water to give a solution of the xanthan.

The dried dispersion is rather unstable and so should not be allowed to stand for prolonged periods without agitation.

The following are examples of dispersions according to the invention in which the polysaccharide is a carboxyalkyl hydroxyalkyl cellulose, and in particular when it is carboxymethyl hydroxyethyl cellulose, and their use as fluid loss additives in oil field cements.

EXAMPLE 10

A solution of carboxymethyl hydroxyethyl cellulose (7.2% dry weight) in water (139 parts) is added with vigorous agitation to an oil phase consisting of:
88.3 parts SBP 11 (Shell) (volatile oil)
1.84 parts Stabiliser (as in Example 1 of 8325503
1.23 parts Tween 81 (surfactant, HLB=10.0)
1.00 parts Shell Pale Oil 60 (non-volatile oil)

The temperature of the emulsion is raised to 85° C. and mixing continued for 30 minutes. A further 13.3 parts of SBP 11 oil is added and next the emulsion is distilled at 65° C. under reduced pressure until no further azeotrope can be collected. The pressure is reduced further to approximately 14 mmHg and the temperature increased gradually at 94° C. to remove volatile oil. The resulting cooled suspension is observed to be smooth and mobile with a final solids content of 58 wt. %. No hard-packed sediment is formed when this product is allowed to stand for several days.

EXAMPLE 11

The dispersion prepared according to Example 10 was evaluated as a fluid loss additive in an oil field cement. As control, the same polymer was used as a dry additive.

A cement slurry was prepared by dissolving a turbulence inducer (nephthalene sulphonic acid) (1.44 pts) in deionised water (29 parts). The fluid loss additive was added to give (0.19, 0.36 and 0.72 parts dry on total weight). After 30 seconds high speed mixing in a Waring Blender cement (Blue Circle class G) (69 parts) was added. Mixing was continued for 30 seconds. The slurry was then conditioned at 180° F. by stirring for 20 minutes. The API fluid loss was determined by measuring the volume of filtrate produced after 30 minutes at a differential pressure of 100 psi. The results are tabulated below:

| Fluid Loss additive | Carboxymethyl Hydroxyethyl cellulose dispersion | | | Carboxymethyl Hydroxyethyl cellulose dispersion | | |
|---|---|---|---|---|---|---|
| Dose level Wt. % on total | 0.19 | 0.36 | 0.72 | 0.19 | 0.36 | 0.72 |
| Fluid Loss Mls. after 30 mins | 24.0 | 6.8 | 4.5 | 23.5 | 8.0 | 4.3 |

The dispersion, according to this invention, has given results similar to the solid.

We claim:

1. A method of making a composition containing microbial polysaccharide that has been made by fermentation in a fermentation broth, the method comprising emulsifying a viscous aqueous solution of the microbial polysaccharide and selected from the fermentation broth and concentrates thereof and having a consistency index of above 25,000 cps into an oil in the presence of a water-in-oil emulsifying agent having HLB below 11 to form a water-in-oil emulsion containing from 25 to 80% by weight of the said aqueous solution and drying the product to reduce the water content based on water plus microbial polysaccharide, to below 50% by weight and to a microbial polysaccharide content of above 25% by weight.

2. A method according to claim 1 in which the drying is by azeotropic distillation.

3. A method according to claim 1 in which the water-in-oil emulsifier comprises sorbitan monooleate.

4. A method according to claim 1 in which the dispersion of the aqueous polysaccharide solution in oil is conducted so that the majority of the polysaccharide particles have a size of from 2 to $10\mu$.

5. A method according to claim 1 in which the dispersion of the aqueous polysaccharide solution in oil is conducted such that about 3 to 20% by weight of the particles are above about $10\mu$ in size, about 3 to 20% of the particles are below about $1\mu$ in size and the remainder are between 1 and $10\mu$ in size.

6. A method according to claim 1 in which the emulsion is formed in the presence of an oil soluble polymeric stabilizer.

7. A method according to claim 1 in which the emulsion is formed in the presence of an amphipathic copolymeric stabilizer formed from one or more hydrophobic monomers and one or more hydrophilic monomers.

8. A method according to claim 1 in which the emulsifying agent comprises a surfactant that has an HLB value at 20° C. of from 7 to 11 and that is a water-in-oil emulsifying agent only at a temperature above 20° C. and the dispersion is prepared at an elevated temperature at which the surfactant is a water-in-oil emulsifying agent.

9. A method according to claim 1 in which the dried product is a flocculated dispersion of polysaccharide in oil.

10. A method according to claim 1 in which the dried product is a dispersion containing from 25 to 70% by weight polysaccharide and less than 10% by weight water, based on the weight of polysaccharide.

11. A method according to claim 1 in which the dispersion of the aqueous microbial polysaccharide solution in oil is conducted so that a majority of the polysaccharide particles have a size of from 2 to $10\mu$, and in which the dried polysaccharide product is a flocculated dispersion of polysaccharide in oil.

12. A method of making a composition containing xanthan that has been made by fermentation in a fermentation broth, the method comprising emulsifying a viscous aqueous solution of the xanthan having a consistency index of above 20,000 cps and selected from the fermentation broth and concentrates thereof and having a concentration of 5 to 20% into an oil in the presence of a water-in-oil emulsifying agent having HLB below 11 to form a water-in-oil emulsion containing from 25 to 80% by weight of the said aqueous solution and drying the product to reduce the water content based on water plus xanthan, to below 50% by weight and to a xanthan content of above 25% by weight.

13. A method according to claim 12 in which the drying is by azeotropic distillation.

14. A method according to claim 12 in which the water-in-oil emulsifier comprises sorbitan monooleate.

15. A method according to claim 12 in which the dispersion of the aqueous xanthan solution in oil is conducted so that the majority of the xanthan particles have a size of from 2 to $10\mu$.

16. A method according to claim 12 in which the dispersion of the aqueous polysaccharide solution in oil is conducted such that about 3 to 20% by weight of the particles are above about $10\mu$ in size, about 3 to 20% of the particles are below about $1\mu$ in size and the remainder are between 1 and $10\mu$ in size.

17. A method according to claim 12 in which the emulsion is formed in the presence of an oil soluble polymeric stabilizer.

18. A method according to claim 12 in which the emulsion is formed in the presence of an amphipathic copolymeric stabilizer formed from one or more hydrophobic monomers and one or more hydrophilic monomers.

19. A method according to claim 12 in which the emulsifying agent comprises a surfactant that has an HLB value at 20° C. of from 7 to 11 and that is a water-in-oil emulsifying agent only at a temperature above 20° C., and the dispersion is prepared at an elevated temperature at which the surfactant is a water-in-oil emulsifying agent.

20. A method according to claim 12 in which the dried product is a flocculated dispersion of xanthan in oil.

21. A method according to claim 12 in which the dried product is a dispersion containing from 25 to 70% by weight xanthan and less than 10% by weight water, based on the weight of xanthan.

22. A method according to claim 12 in which the dispersion of the aqueous xanthan solution in oil is conducted so that a majority of the xanthan particles have a size from 2 to $10\mu$, and in which the dried xanthan product is a flocculated dispersion of xanthan in oil.

* * * * *